(12) United States Patent
Vajravel et al.

(10) Patent No.: US 11,762,783 B1
(45) Date of Patent: Sep. 19, 2023

(54) ENUMERATING DOCK-CONNECTED PERIPHERALS IN A PREFERRED ORDER

(71) Applicant: Dell Products L.P., Round Rock, TX (US)

(72) Inventors: Gokul Thiruchengode Vajravel, Bangalore (IN); Vivek Viswanathan Iyer, Austin, TX (US); Karthikeyan Krishnakumar, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/739,686

(22) Filed: May 9, 2022

(51) Int. Cl.
*G06F 13/10* (2006.01)
*G06F 13/40* (2006.01)

(52) U.S. Cl.
CPC ........ *G06F 13/102* (2013.01); *G06F 13/4081* (2013.01)

(58) Field of Classification Search
None
See application file for complete search history.

(56) References Cited

U.S. PATENT DOCUMENTS 9,483,421 B1 * 11/2016 Wieland ................ G06F 13/105
2018/0107246 A1 * 4/2018 Dees ...................... H04W 4/50

* cited by examiner

*Primary Examiner* — Scott C Sun
(74) *Attorney, Agent, or Firm* — Kirton McConkie; Brian Tucker (57) ABSTRACT

Dock-connected peripherals can be enumerated in a preferred order. When a client computing device is connected to a dock, a dock service can report peripherals connected to the dock one-by-one to ensure that each peripheral is enumerated in the preferred order. The preferred order can be defined based on a user's usage of the peripherals including an order of usage, a usage frequency, and a purpose.

20 Claims, 13 Drawing Sheets

FIG. 1

Peripheral Usage Table 201

| Unique IDs | No. | Peripheral Name | Windows Device Class | Purpose | Order of Usage | Usage Freq. | Correlation |
|---|---|---|---|---|---|---|---|
| | 1 | Mouse | HID | Wake Up | 1 | 80 | Immediate & High Usage |
| | 2 | External Webcam | Camera | Authentication | 2 | 50 | Immediate & Medium Usage |
| | 3 | Display | Display | Productivity | 3 | 100 | Immediate & High Usage |
| | 4 | Keyboard | HID | Productivity | 4 | 85 | Immediate & High Usage |
| CCDID DockID UserID | 5 | Joystick | HID | Gaming | 5 | 75 | Gradual & High Usage |
| | 6 | Printer | Printer | Misc | 6 | 15 | Delayed & Rare Usage |
| | 7 | Scanner | Imaging | Misc | 7 | 5 | Delayed & Very Rare Usage |
| | 8 | Speaker | Audio | UCS | 8 | 55 | Delayed & Medium Usage |
| | 9 | Mic | Audio | UCS | 9 | 50 | Delayed & Medium Usage |

*FIG. 2A*

| Unique IDs | Peripheral Enumeration Order Table 202 | | | | |
|---|---|---|---|---|---|
| | No. | Peripheral Name | Windows Device Class | Purpose | Preferred Order |
| | 1 | Mouse | HID | Wake Up | 1 |
| | 2 | External Webcam | Camera | Authentication | 2 |
| | 3 | Display | Display | Productivity | 3 |
| | 4 | Keyboard | HID | Productivity | 4 |
| CCDID1 DockID1 UserID1 | 5 | Joystick | HID | Gaming | Default |
| | 6 | Printer | Printer | Misc | Default |
| | 7 | Scanner | Imaging | Misc | Default |
| | 8 | Speaker | Audio | USC | Default |
| | 9 | Mic | Audio | USC | Default |

ENUMERATING DOCK-CONNECTED PERIPHERALS IN A PREFERRED ORDER

CROSS-REFERENCE TO RELATED APPLICATIONS

N/A

BACKGROUND

A user may oftentimes use his or her client computing device in a workspace. In this context, a workspace can be viewed as an environment that includes a client computing device (e.g., a laptop), a wired or wireless dock to which the client computing device connects, and peripherals that are connected to the dock. Such peripherals may commonly include external displays, a keyboard, a mouse, a webcam, a printer, a speaker, a fingerprint scanner, etc.

A workspace may oftentimes be used for hybrid work scenarios. For example, a business may have an office space that includes hoteling cubes that can be assigned to, reserved by, or otherwise utilized by the business's employees as workspaces. In such cases, the business may allow its employees to connect their laptops to a dock in a particular hoteling cube where various peripherals may be available for use. Users may also employ workspaces when working from home.

When a user connects his or her laptop (or other client computing device) to a dock in a workspace, the operating system on the laptop will enumerate the peripherals attached to the dock in a random order. This creates various challenges. For example, if the user prefers to log in via Windows Hello using an external webcam connected to the dock, the user will have to wait for the external webcam to be enumerated. Due to the random order of enumeration, the operating system may enumerate other peripherals before the external webcam thus causing a burdensome delay for the user or causing the user to open the laptop to use an internal webcam to log in. As another example, after connecting the laptop to the dock, a user may desire to wake up the laptop using an external keyboard, mouse, or other peripheral connected to the dock. Again, however, the user will have to wait until such peripherals are enumerated or may open the laptop to awaken it using the internal keyboard or touchpad. As a further example, some users may prefer resuming an activity, such as gaming, immediately upon logging in. In such cases, a user would need to wait for the peripherals used for the activity, such as a gaming controller, headset, etc., to be enumerated before resuming the activity. If there are many peripherals connected to the dock, there can be a substantial delay before all such peripherals are enumerated. For such reasons, the user experience can be degraded when using a workspace.

BRIEF SUMMARY

The present invention extends to systems, methods, and computer program products for enumerating dock-connected peripherals in a preferred order. When a client computing device is connected to a dock, a dock service can report peripherals connected to the dock one-by-one to ensure that each peripheral is enumerated in the preferred order. The preferred order can be defined based on a user's usage of the peripherals including an order of usage, a usage frequency, and a purpose.

In some embodiments, the present invention may be implemented as a method for enumerating peripherals that are connected to a dock in a preferred order. It can be detected that a client computing device has been connected to a dock to which peripherals are connected. A preferred order for enumerating the peripherals can be provided to a dock service executing on the dock. The dock service can report a first peripheral of the peripherals to an operating system of the client computing device. The dock service can wait to report a second peripheral of the peripherals to the operating system until being notified that the first peripheral has been enumerated on the client computing device.

In some embodiments, the present invention may be implemented as computer storage media storing computer executable instructions which when executed implement a method for enumerating peripherals that are connected to a dock in a preferred order. It can be detected that a client computing device has been connected to a dock to which peripherals are connected. A preferred order for enumerating the peripherals can be provided to a dock service executing on the dock. For each of a first set of the peripherals, the dock service can report the peripheral to an operating system of the client computing device and then wait until the peripheral is enumerated before reporting a next peripheral in the first set.

In some embodiments, the present invention may be implemented as a system that includes a client computing device having an operating system, a service, and an embedded controller service, and a dock having a dock service. The service, the embedded controller service, and the dock service are configured to enumerate peripherals connected to the dock in a preferred order by reporting a peripheral of the connected peripherals for enumeration and then waiting to report another peripheral of the connected peripherals until the enumeration is completed.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "client computing device" should be construed as encompassing any computing device that a user connects to a dock to gain access to one or more peripherals that are connected to the dock. A client computing device may oftentimes be a laptop but could also be a desktop, a tablet, a smart phone, etc. The term "enumeration" will be used in its standard context such as the process of identifying connected/detectable peripherals and preparing the system to access them (e.g., by loading the appropriate drivers). Embodiments of the present invention are described below in the context of a Windows-based client computing device. However, embodiments of the present invention could be implemented in other operating system environments and should not be limited by or to the Windows-specific examples.

Figure 1:
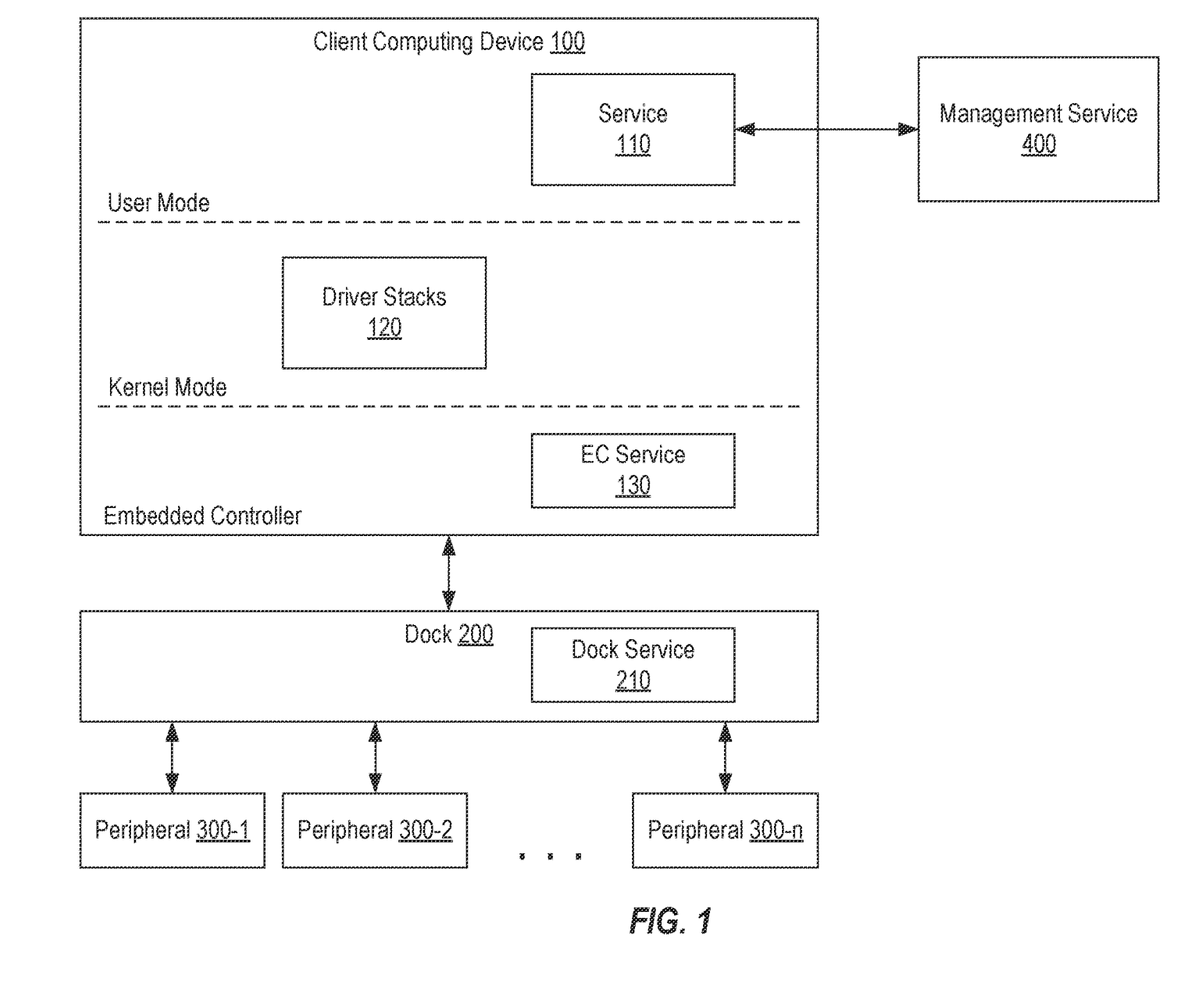
FIG. 1 provides an example of a computing environment in which embodiments of the present invention may be implemented.

FIG. 1 provides an example of a computing environment in which embodiments of the present invention may be implemented. The computing environment includes a client computing device 100, a dock 200, and peripherals 300-1 through 300-*n* (or generally peripheral(s) 300) and therefore represents a workspace. The computing environment may also include a management service 400 which may be cloud-based or otherwise network accessible (e.g., as a stand-alone web service, as part of a device management solution, etc.). However, in some embodiments, management service 400 could be omitted, with its functionality described below being performed by one or more components on client computing device 100 (e.g., service 110).

As an overview, when client computing device 100 is connected to dock 200, the enumeration process can be controlled to ensure that peripherals 300 are enumerated in a preferred order. In some embodiments, this preferred order may be specific to the user of client computing device 100 such as by enumerating peripherals 300 based on how and when the user uses peripherals 300. In some embodiments, this preferred order may be based on client computing device 100, dock 200, and/or peripherals 300. In some embodiments, this preferred order may be learned over time. By enumerating peripherals 300 in a preferred order, the user can more quickly gain access to the peripherals 300 that he or she desires to use immediately upon connecting client computing device 100 to dock 200 to thereby enhance the user's workspace experience.

To facilitate this enumeration of peripherals 300 in a preferred order, various components may be employed. For example, as shown in FIG. 1, a service 110 and an embedded controller (EC) service 130 may be employed on client computing device 100 and a dock service 210 may be employed on dock 200. Service 110 may be or may include a user mode component and may interface with management service 400 in any suitable way. EC service 130 can be a component that executes on an EC of client computing device 100 and may be configured to communicate with service 110 via an out-of-band channel (e.g., via network-based communications). Dock service 210 may be a component that executes on dock 200. Client computing device 100 is also shown as including driver stacks 120 which are intended to represent the results of the enumeration of peripherals 300. In other words, when client computing device 100 is connected to dock 200, the operating system on client computing device 100 will build driver stacks 120 to allow applications or other components on client computing device 100 to access peripherals 300. As suggested above, embodiments of the present invention can cause the process of building driver stacks 120 to be altered to ensure that some of peripherals 300 become accessible before other peripherals 300.

One or more data structures could be used as part of the process of enumerating peripherals 300 in a preferred order. For example, FIG. 2A includes an example of a peripheral usage table 201 that service 110 could create/maintain to track a user's usage of peripherals 300, and FIG. 2B includes an example of a peripheral enumeration order table 202 that may be used to define an order in which peripherals 300 should be allowed to be enumerated in accordance with the techniques of embodiments of the present invention. In some embodiments, an instance of peripheral enumeration order table 202 could be derived from peripheral usage table 201 (i.e., it could be based on the user's usage of peripherals 300). In some embodiments, an instance of peripheral enumeration order table 202 could be selected based on one or more of client computing device 100, dock 200, or peripherals 300.

Figure 2A:
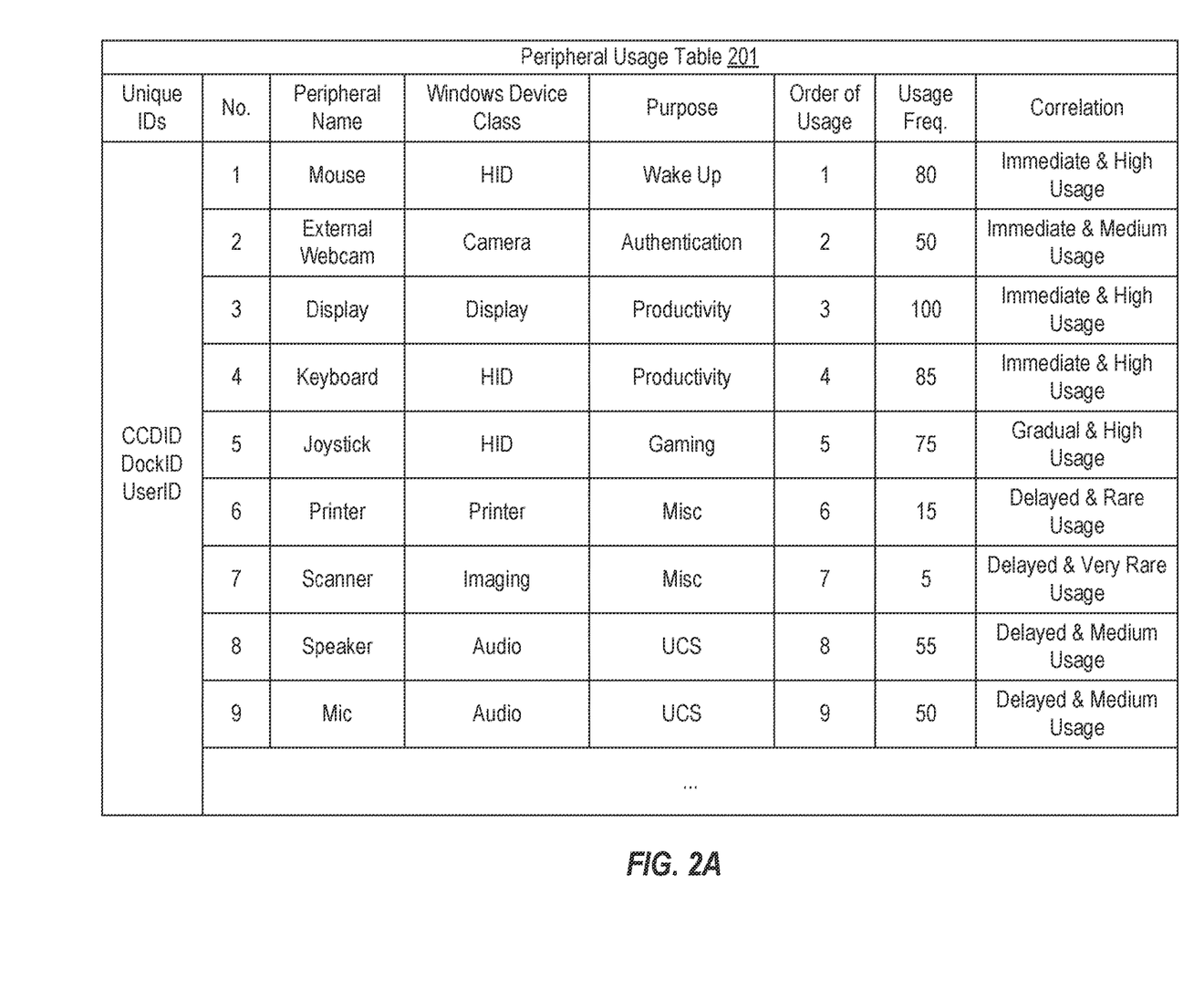
FIGS. 2A and 2B provide examples of data structures that could be used in implementations of embodiments of the present invention.

Turning to FIG. 2A, peripheral usage table 201 is shown as associating a set of unique IDs with various information. These unique IDs include an identifier (CCDID) of client computing device 100 which could be its SMBIOS ID, MachineGUID, or any other identifier that may represent a particular client computing device or type of client computing device, an identifier (DockID) of dock 200 which could be a serial number or other identifier(s) capable of representing a particular dock or type of dock, and an identifier (UserID) of the user which could be an email address or other unique identifier of the user. These unique IDs can be used to facilitate the tracking of the user's usage of peripherals that are connected to a dock, including a particular dock, when a computing device, including a particular computing device, is connected to a/the dock. In some embodiments, only a user ID may be employed (e.g., when the same preferred order may be used to enumerate peripherals whenever the user connects any client computing device to any dock). However, by using the ID of the client computing device and/or the dock, a preferred order of enumerating peripherals can be based also on the particular client computing device and/or the dock.

In some embodiments, service 110 can be configured to determine whether peripheral usage table 201 has already been defined on or for client computing device 100 and, if not, can commence monitoring the user's usage of peripherals 300 when client computing device 100 is connected to dock 200 to thereby create peripheral usage table 201. In some embodiments, service 110 could be configured to periodically recreate or update peripheral usage table 201 to ensure that it reflects the user's current usage habits.

It is assumed that peripheral usage table 201 is specific to client computing device 100 and dock 200 and therefore lists peripherals 300 that the user has used while client computing 100 was connected to dock 200. Each peripheral 300 listed in peripheral usage table 201 can be identified by name and type (e.g., the Windows device class). Additionally, service 110 can determine the purpose of the user's usage of each peripheral 300 such as for wake up, authentication, productivity, gaming, unified communications system (UCS), miscellaneous, etc. For example, service 110 can be configured to detect when client computing device 100 is connected to dock 200 (a "dock connection event") and can then detect when the user uses a peripheral 300 (a "peripheral usage event") and for what purpose such as detecting that the user uses an external mouse to wake up the system or uses an external webcam for Windows Hello authentication.

In addition to detecting the user's purpose for using a peripheral 300, service 110 can also track the order in which the user uses each peripheral 300 after the dock connection is detected. For example, service 110 could detect that the user first uses a mouse to wake up the system, then uses an external webcam in conjunction with an external display to authenticate, then uses a keyboard and the mouse to commence work, etc. Service 110 can also track how frequently the user uses each peripheral 300. In the depicted example, it is assumed that service 110 represents the usage frequency as a normalized value between 0 and 100. Therefore, the display is used 100% of the time, the keyboard is used 85% of the time, the mouse is used 80% of the time, etc.

Peripheral usage table 201 is also shown as including a correlation for each peripheral 300. This correlation may be based on the order of usage and usage frequency values and may generally define how soon after the dock connection each peripheral is used (a "timing correlation") and how frequently each peripheral is used thereafter (a "frequency correlation"). For example, the mouse, external webcam, display, and keyboard each have an immediate timing correlation value based on the order of usage values. In some embodiments, this timing correlation value may also be based on the timing of usage after the dock connection event which service 110 could determine from timestamps it stores in conjunction with each dock connection event and peripheral usage event. For example, if a peripheral usage event consistently falls within a first defined threshold of a dock connection event, the corresponding peripheral can be given an immediate timing correlation value. Frequency correlation values could be assigned based on the usage frequency. For example, a peripheral 300 that the user uses more than 70% of the time can be given a high usage frequency correlation value while a peripheral 300 that the user uses less than 10% of the time can be given a very rare usage frequency correlation value.

Figure 2B:
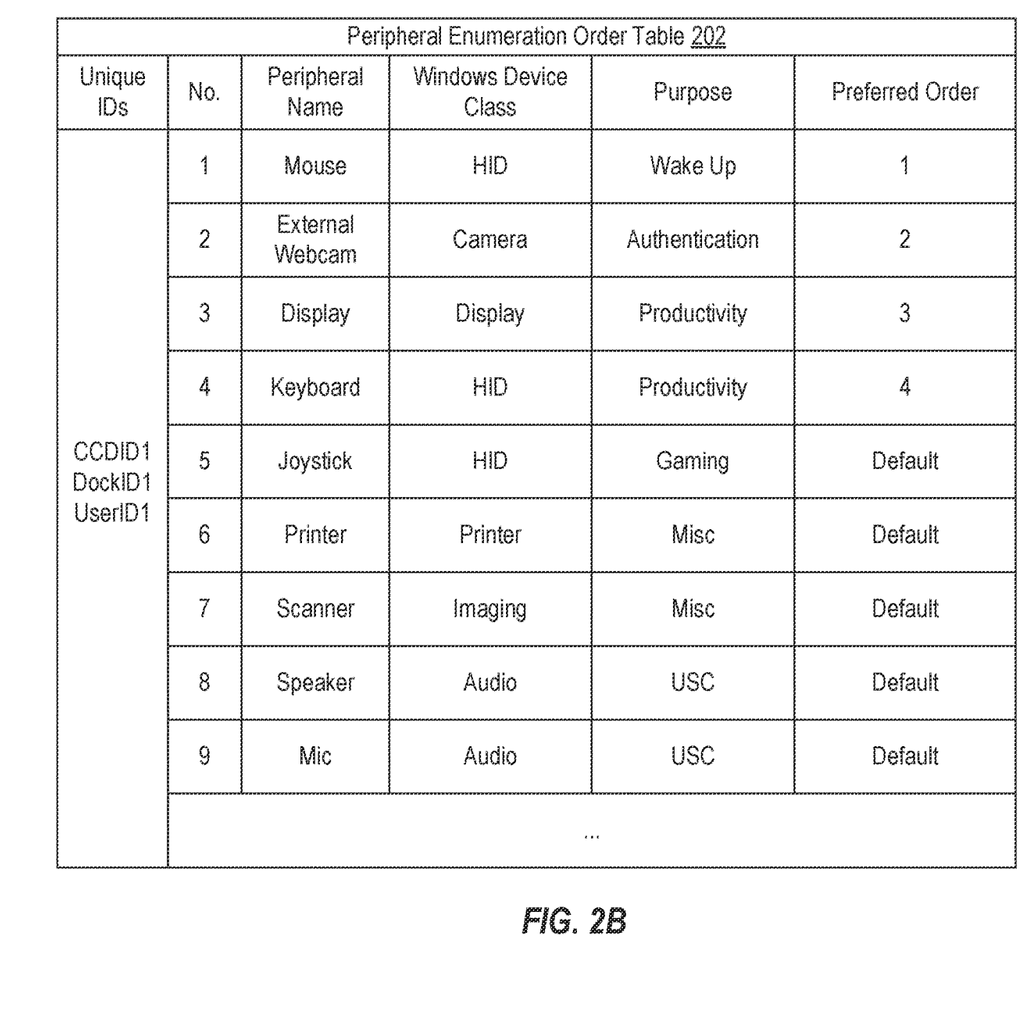

In some embodiments, service 110 may be configured to monitor the user's use of peripherals 300 over a specified number of dock connection events (e.g., the first 10 times that the user connects client computing device 100 to dock 200) to create peripheral usage table 201. After the specified number of dock connection events have occurred, peripheral usage table 201 could be used (e.g., by service 110 or management service 400) to create peripheral enumeration order table 202. In some embodiments, service 110 may leverage machine learning to determine the information of peripheral usage table 201 with greater accuracy and/or efficiency. Peripheral enumeration order table 202 may identify each peripheral 300, its purpose, and a preferred order for enumeration. The preferred order for enumeration may be determined based on the correlation values (or based on the order of usage and usage frequency values) and possibly the purpose. For example, the peripherals could initially be sorted in descending order based on the usage frequency values and then those with the highest usage frequency values could be sorted in descending order based on the order of usage. In some embodiments, peripherals with a particular purpose could be positioned higher in the order. In the depicted example, it is assumed that the preferred order is (1) mouse, (2) external webcam, (3) display, and (4) keyboard, with the remaining peripherals being defined as default. In this context, default may represent that the enumeration of the peripheral will be allowed to occur in a default fashion after the other peripherals are enumerated in the preferred order. However, in some embodiments, a specific order could be defined for all peripherals. Also, any other suitable technique for defining a preferred order based on order of usage, usage frequency, and/or purpose could be used. Of importance is that a preferred order for enumerating at least some of peripherals is defined based on the user's use or anticipated/predicted use of such peripherals.

In some embodiments, service 110 may share peripheral usage table 201 with management service 400 to enable management service 400 to generate peripheral enumeration order table 202. In some embodiments, such as before peripheral usage table 201 has been created, management service 400 could create peripheral enumeration order table 202 from peripheral usage table(s) that have been created from other users, for similar client computing devices, for similar docks, for similar sets of peripherals, etc. In some embodiments, management service 400 could create/maintain multiple instances of peripheral enumeration order table 202 for a user such as when the user may connect client computing device 100 to different docks or may use different client computing devices. In some embodiments, an administrator may be able to define peripheral enumeration order table 202 for a particular user, a particular client computing device, a particular dock, etc. Regardless of how peripheral enumeration order table 202 may be defined, it may be made available to service 110 on client computing device 100 to enable peripherals 300 to be enumerated in the specified preferred order.

Figure 3A:
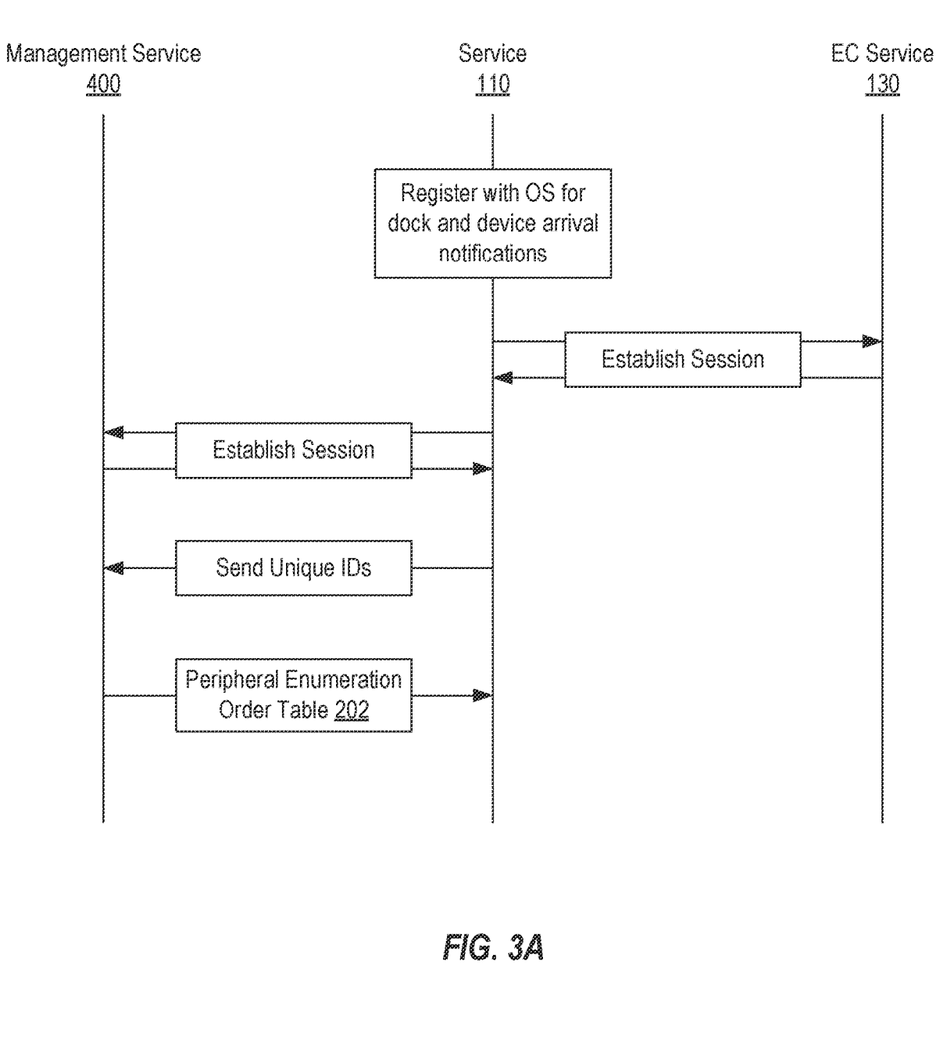
FIGS. 3A and 3B are flow diagrams representing functionality that may be performed in one or more embodiments of the present invention.
Figure 3B:
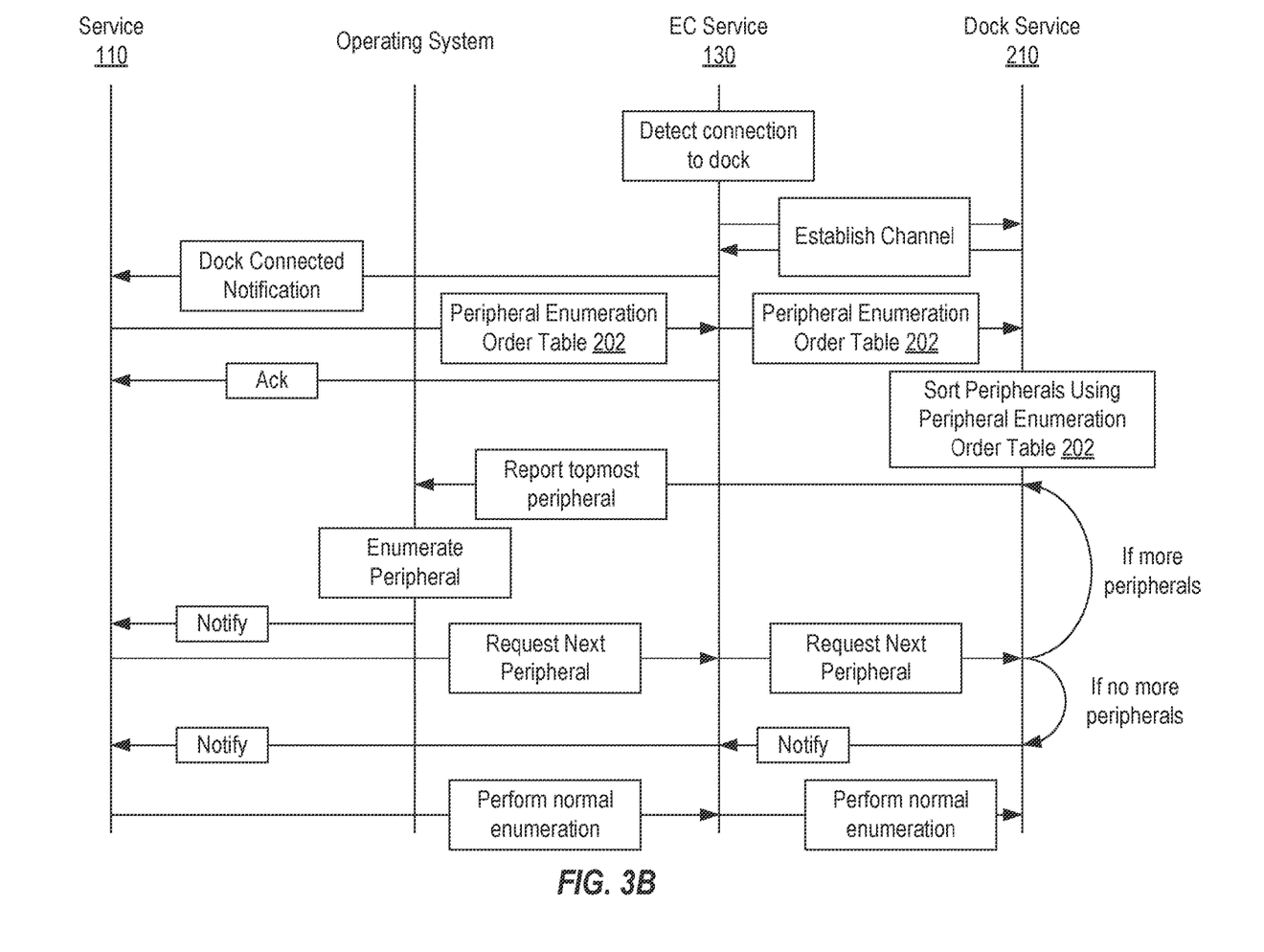

FIGS. 3A and 3B are flow diagrams representing functionality that may be performed in one or more embodiments of the present invention to cause peripherals 300 connected to dock 200 to be enumerated in the preferred order defined in peripheral enumeration order table 202. FIG. 3A represents functionality that service 110 can initially perform (e.g., as part of its initialization when it is loaded on client computing device 100). Notably, in some instances, service 110 can perform this functionality before client computing device 100 has been connected to dock 200. Service 110 can register with the operating system to be notified of dock and device arrival notifications (e.g., to be notified when client computing device 100 has been connected to dock 200 and when each peripheral 300 is being enumerated). Service 110 may also establish a session with EC service 130 and with management service 400. In this context, establishing a session can entail any functionality to enable service 110 to communicate with EC service 130 and management service 400. In this example, it is assumed that management service 400 maintains peripheral enumeration order tables for participating users and client computing devices, and therefore service 110 may send unique IDs (e.g., IDs of the user, client computing device 100, and/or dock 200) to management service 400 to retrieve the appropriate instance of peripheral enumeration order table 202. However, in some embodiments, service 110 may store peripheral enumeration order table 202 on client computing device 100, in which case it may not be necessary to interface with management service 400.

FIG. 3B represents functionality that can be performed when client computing device 100 is connected to dock 200 to ensure that peripherals 300 are enumerated in the preferred order. EC service 130 can be configured to detect when client computing device 100 is connected to dock 200. Upon detecting the connection to dock 200, EC service 130 can establish a channel for communicating with dock service 210. EC service 130 and dock service 210 could use any suitable technique for establishing this channel such as by communicating over a wired connection between client computing device 100 and dock 200 (e.g., a USB-C connection) or over a wireless connection.

In conjunction with establishing the channel with dock service 210, EC service 130 can notify service 110 that client computing device 100 has been connected to dock 200 (e.g., via the channel that service 110 established as part of its initialization). Notably, this notification is distinct from any notification that the operating system may provide. In response to receiving this notification, service 110 can share peripheral enumeration order table 202 (or at least the preferred order that it defines) with EC service 130 which in turn shares peripheral enumeration order table 202 with dock service 210. EC service 130 can provide acknowledgement to service 110 that peripheral enumeration order table 202 was successfully shared with dock service 210.

Dock service 210 can be configured to manage the reporting of peripherals 300 to the operating system of client computing device 100. Therefore, dock service 210 may refrain from initiating the enumeration of peripherals 300 until receiving peripheral enumeration order table 202. Dock service 210 may identify which peripherals 300 are connected to dock 200 and, in conjunction with receiving peripheral enumeration order table 202, may sort them in accordance with peripheral enumeration order table 202. For example, assuming peripherals 300 include one or more displays, a keyboard, a webcam, and a mouse, dock service 210 can use peripheral enumeration order table 202 to determine that the mouse should be enumerated first, followed by the webcam, the display, and the keyboard.

With this preferred order determined, dock service 210 can commence reporting peripherals 300 to the operating system to cause them to be enumerated. Dock service 210 can do so one-by-one following the preferred order. For example, dock service 210 can report the topmost peripheral 300 in its sorted list which, based on the example in FIG. 2B, would be the mouse. The operating system would then enumerate the peripheral 300 including notifying service 110 due to service 110's registration for device arrival notifications. Upon receiving a device arrival notification, service 110 can determine whether it pertains to a peripheral 300 (as opposed to another device that is not connected to dock 200) such as by determining whether the root of the device's stack/tree is dock 200. If so, service 110 can instruct EC service 130 that the next peripheral 300 should be enumerated which could in turn instruct dock service 210. In this way, dock service 210 will wait to initiate the enumeration of the next peripheral 300 until service 110 has confirmed that the previously reported peripheral 300 has been enumerated. This process can be repeated until dock service 210 determines that there are no more peripherals 300 that require preferred order enumeration. For example, dock service 210 could initiate the enumeration of the mouse, the webcam, the display, and the keyboard in order. Then, upon receiving the request to enumerate the next peripheral 300 after the keyboard has been enumerated, dock service 210 may send a notification to EC service 130 that there are no more peripherals 300 that should be enumerated in the preferred order (e.g., only peripherals 300 having a default preferred order value remain). EC service 130 can relay this notification to service 110. Service 110 may then instruct EC service 130 that normal/default enumeration should be performed for the remaining peripherals 300 which in turn may instruct dock service 210. In response, dock service 210 may commence reporting the remaining peripherals 300 to the operating system in any order (e.g., to cease reporting peripherals one-by-one).

By reporting peripherals 300 one-by-one, dock service 210 ensures that the operating system will enumerate peripherals 300 in the preferred order. In contrast, if dock service 210 reported peripherals 300 in a typical fashion (i.e., without waiting for confirmation that a reported peripheral 300 has been enumerated), the operating system would enumerate peripherals 300 in a random/uncontrollable order even if dock service 210 reported them in order.

Figure 4A:
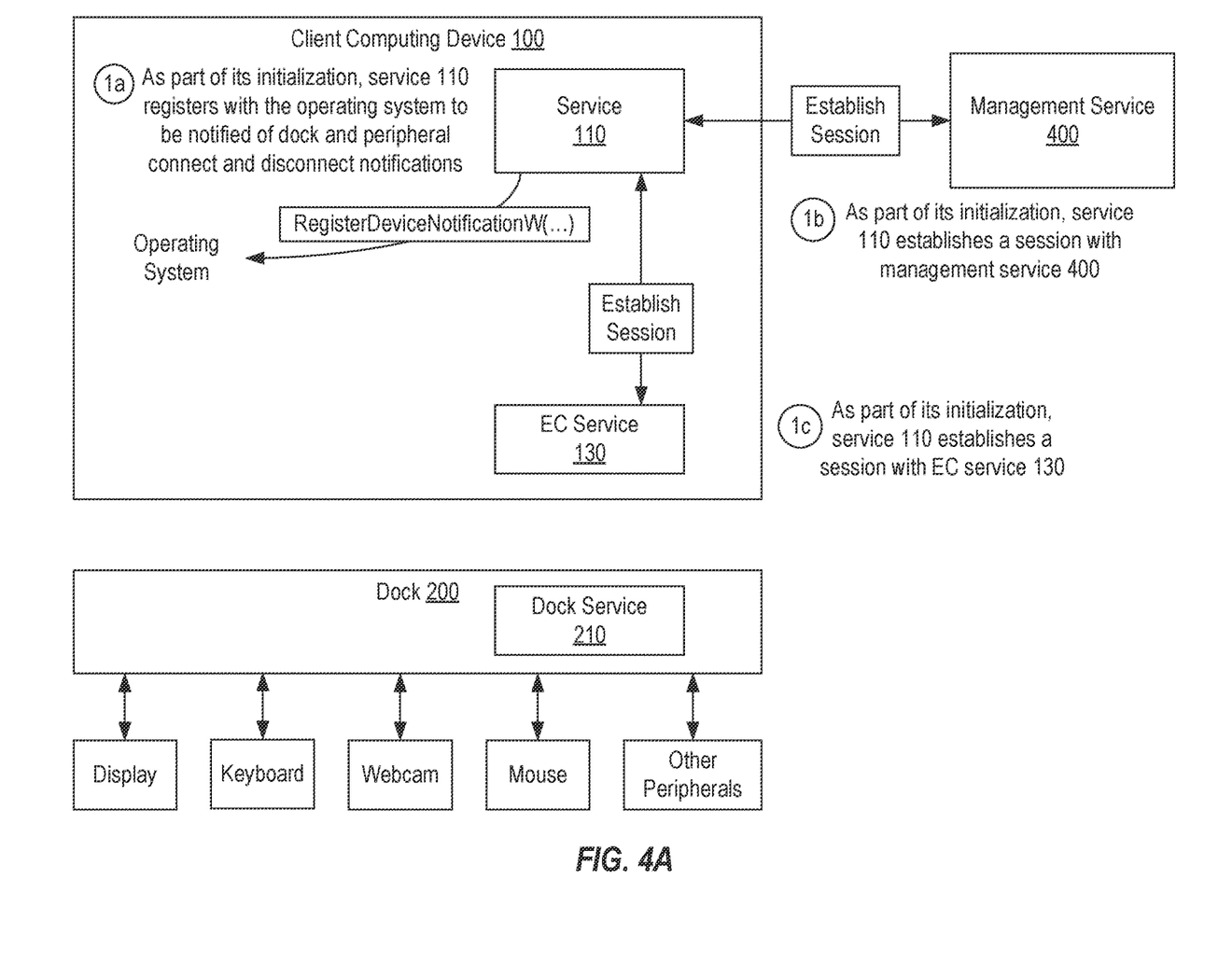
FIGS. 4A-4G provide an example of how peripherals can be enumerated in a preferred order in accordance with one or more embodiments of the present invention.
Figure 4B:
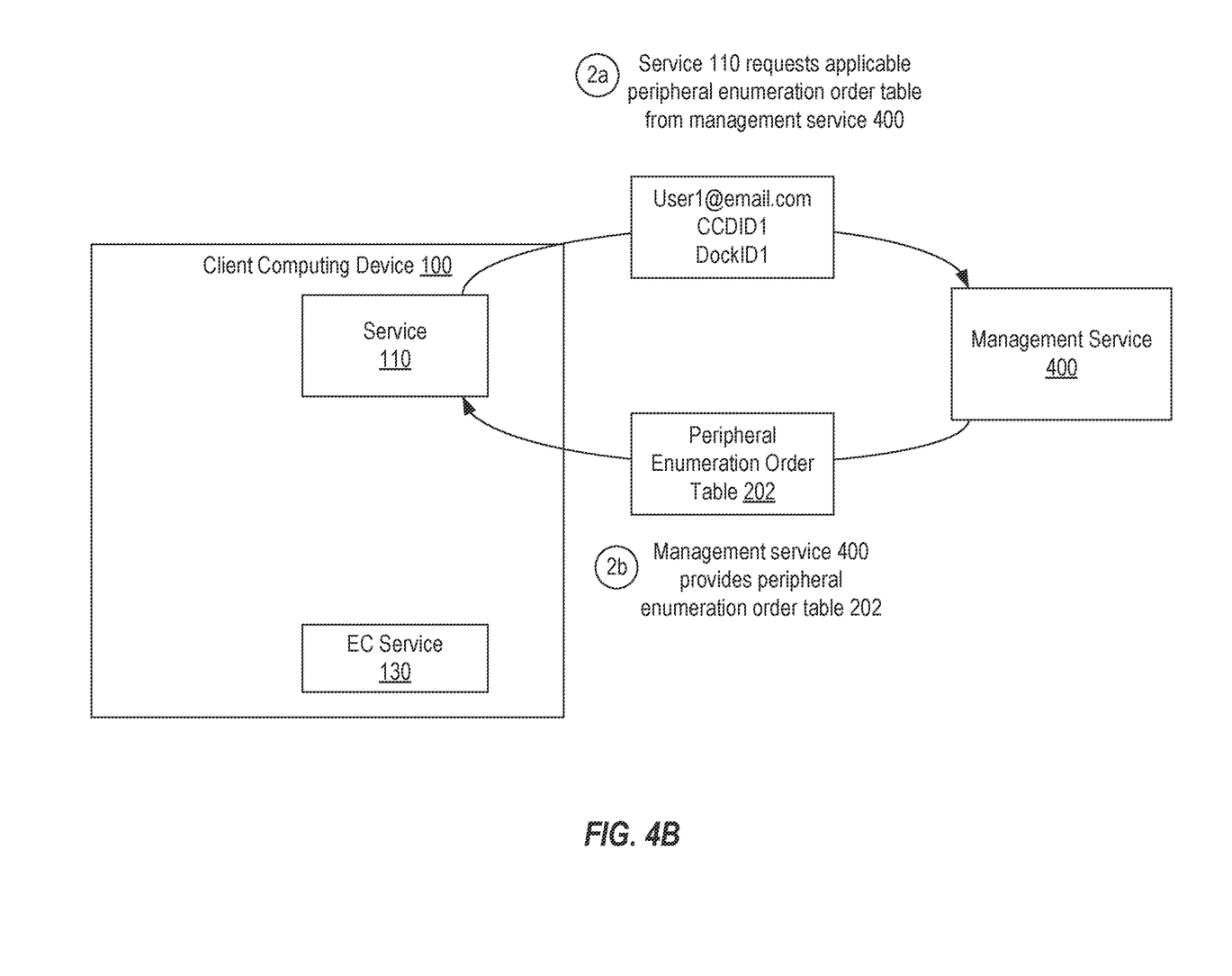

FIGS. 4A-4G provide an example of how peripherals can be enumerated in a preferred order in accordance with one or more embodiments of the present invention. In this example, it is assumed that a display, a keyboard, a webcam, a mouse, and other peripherals are connected to dock 200. FIGS. 4A and 4B represent initial functionality that can be performed and generally correspond with FIG. 3A. In step 1a, as part of its initialization, service 110 registers with the operating system to be notified of dock and peripheral connect and disconnect notifications. For example, service 110 could call the RegisterDeviceNotificationW function when client computing device 100 runs a version of the Windows operating system. In step 1b, service 110 can establish a session with management service 400. In step 1c, service 110 can also establish a session with EC service 130. At this point, it is assumed that client computing device 100 has not yet been connected to dock 200. For example, client computing device 100 could be powered on as the user travels to work where he or she will connect client computing device 100 to dock 200.

Turning to FIG. 4B, in step 2a, service 110 can send a request to management service 400 for the applicable peripheral enumeration table. For example, service 110 could provide the user's email address (or other user ID) and an identifier of client computing device 100 and/or an identifier dock 200 to management service 400. In step 2b, management service 400 can return peripheral enumeration order table 202 (which is assumed to pertain to the user having the email address of user1@email.com). Service 110 may then store peripheral enumeration order table 202. Of course, if service 110 already stores peripheral enumeration order table 202, steps 2a and 2b can be omitted.

Figure 4C:
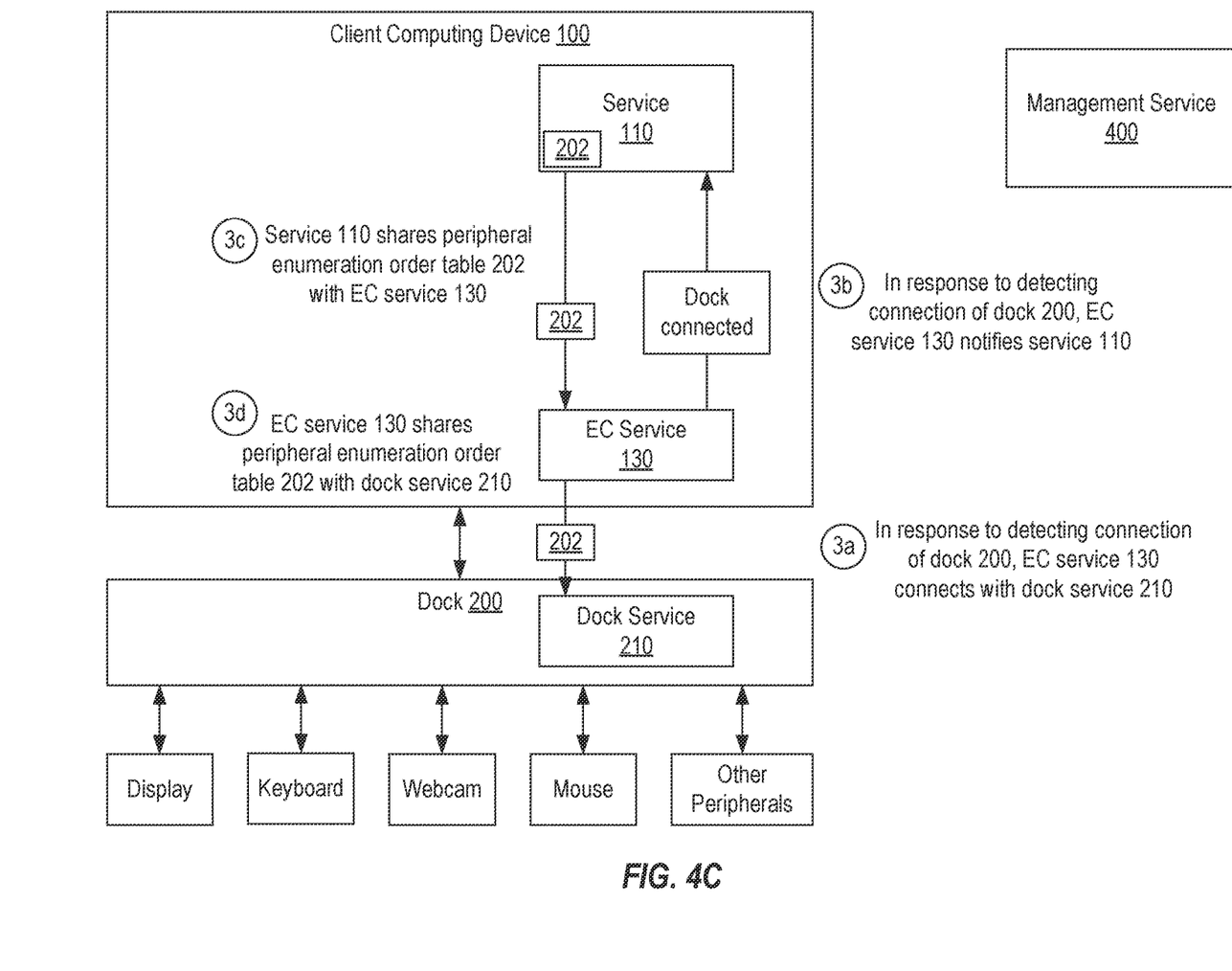

Turning to FIG. 4C, it is assumed that the user has connected client computing device 100 to dock 200. In step 3a, and in response to detecting the connection of dock 200, EC service 130 connects with dock service 210. In step 3b, and also in response to detecting the connection of dock 200, EC service 130 notifies service 110 that dock 200 has been connected. In step 3c, service 110 shares peripheral enumeration order table 202 with EC service 130. In step 3d, EC service 130 shares peripheral enumeration order table 202 with dock service 210.

Figure 4D:
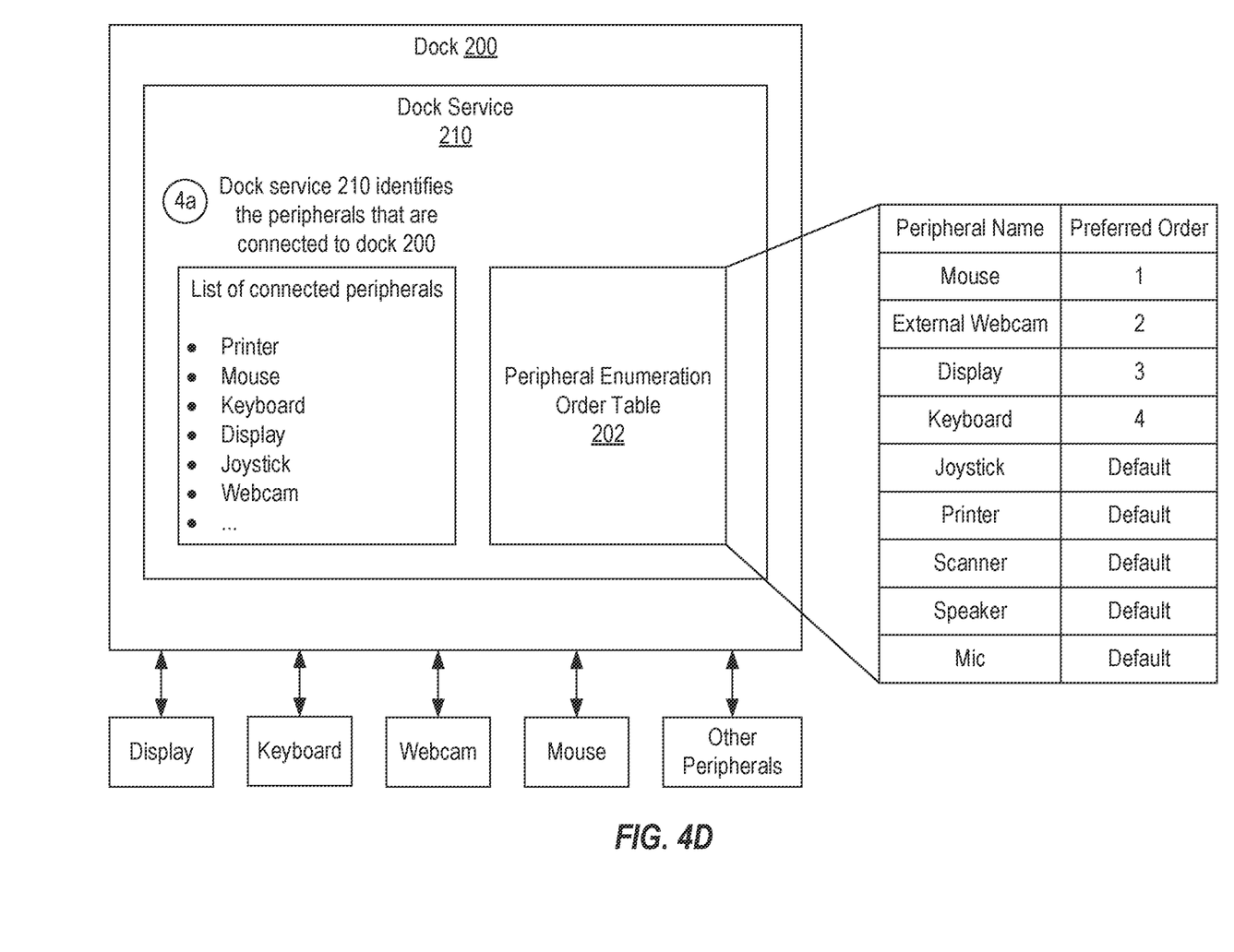

Turning to FIG. 4D, in step 4a, dock service 210 can identify the peripherals that are connected to dock 200. This step could be performed at any time including prior to dock service 210 receiving peripheral enumeration order table 202. In the depicted example, it is assumed that dock service 210 has identified a printer, a mouse, a keyboard, a display, a joystick, a webcam, and other peripherals.

Figure 4E:
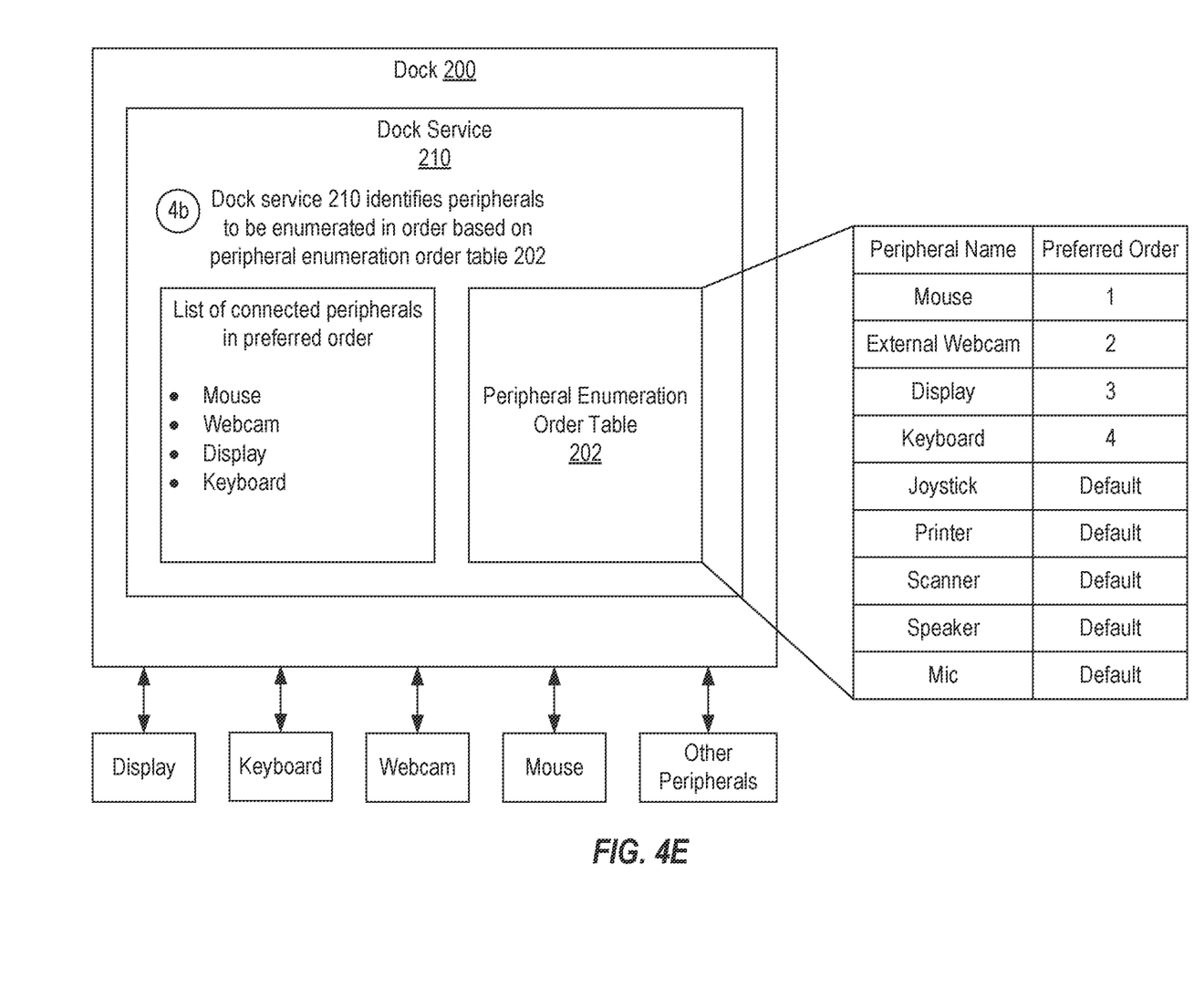

Turning to FIG. 4E, in step 4b, dock service can use peripheral enumeration order table 202 to identify the connected peripherals that should be enumerated in the preferred order defined in peripheral enumeration order table 202. For example, in FIG. 4E, dock service 210 is shown as having created a sorted list containing the mouse, the webcam, the display, and the keyboard. This depiction of a sorted list is for illustrative purposes only and dock service 210 could use any suitable technique to define/identify the order in which the connected peripherals should be enumerated.

Figure 4F:
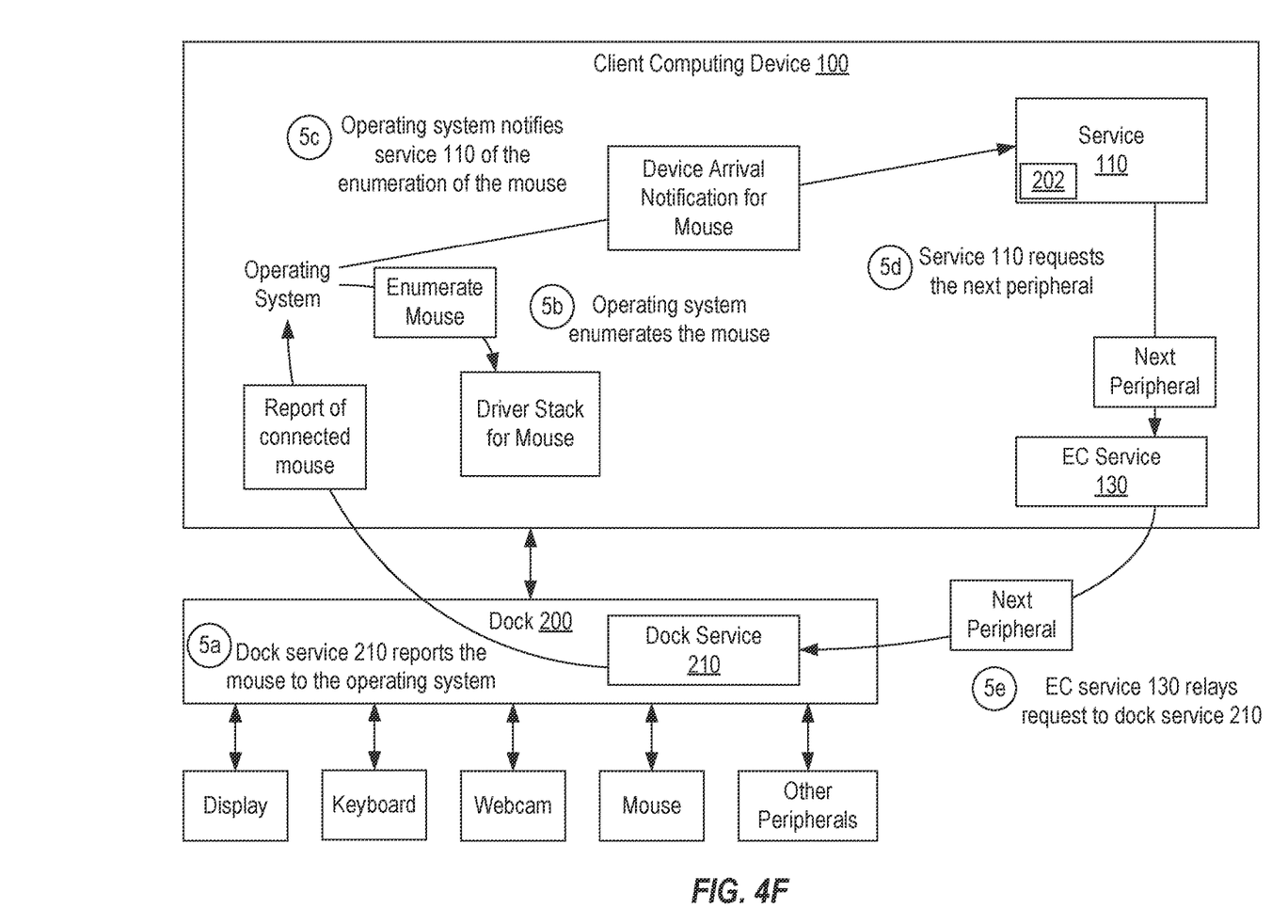

Turning to FIG. 4F, in step 5a, dock service 210 reports the mouse to the operating system based on the mouse being the first peripheral in the preferred order. In step 5b, the operating system enumerates the mouse to cause the driver stack for the mouse to be built thereby rendering the mouse accessible to client computing device 100. Accordingly, at this point, the user could use the mouse to wake the system.

In step 5c, and in conjunction with enumerating the mouse, the operating system notifies service 110. In step 5d, service 110 can examine the notification to determine whether it pertains to a peripheral that is connected to dock 200. In this case, service 110 will determine that the notification pertains to the dock-connected mouse and therefore, in step 5d, service 110 can send a request to EC service 130 that the next peripheral be exposed to the operating system. In step 5e, EC service 130 can relay this request to dock service 210.

Upon receiving the request to expose/report the next peripheral, dock service 210 can repeat the process by reporting the webcam—the next peripheral in the preferred order. The process can be repeated again for the display and then for the keyboard. In this way, dock service 210 can expose the peripherals one-by-one in the preferred order to ensure that the operating system enumerates the peripherals in the preferred order. Notably, this process prevents the operating system from enumerating the peripherals in a random order which could result in delayed enumeration of the peripherals that the user will likely desire to immediately use.

Figure 4G:
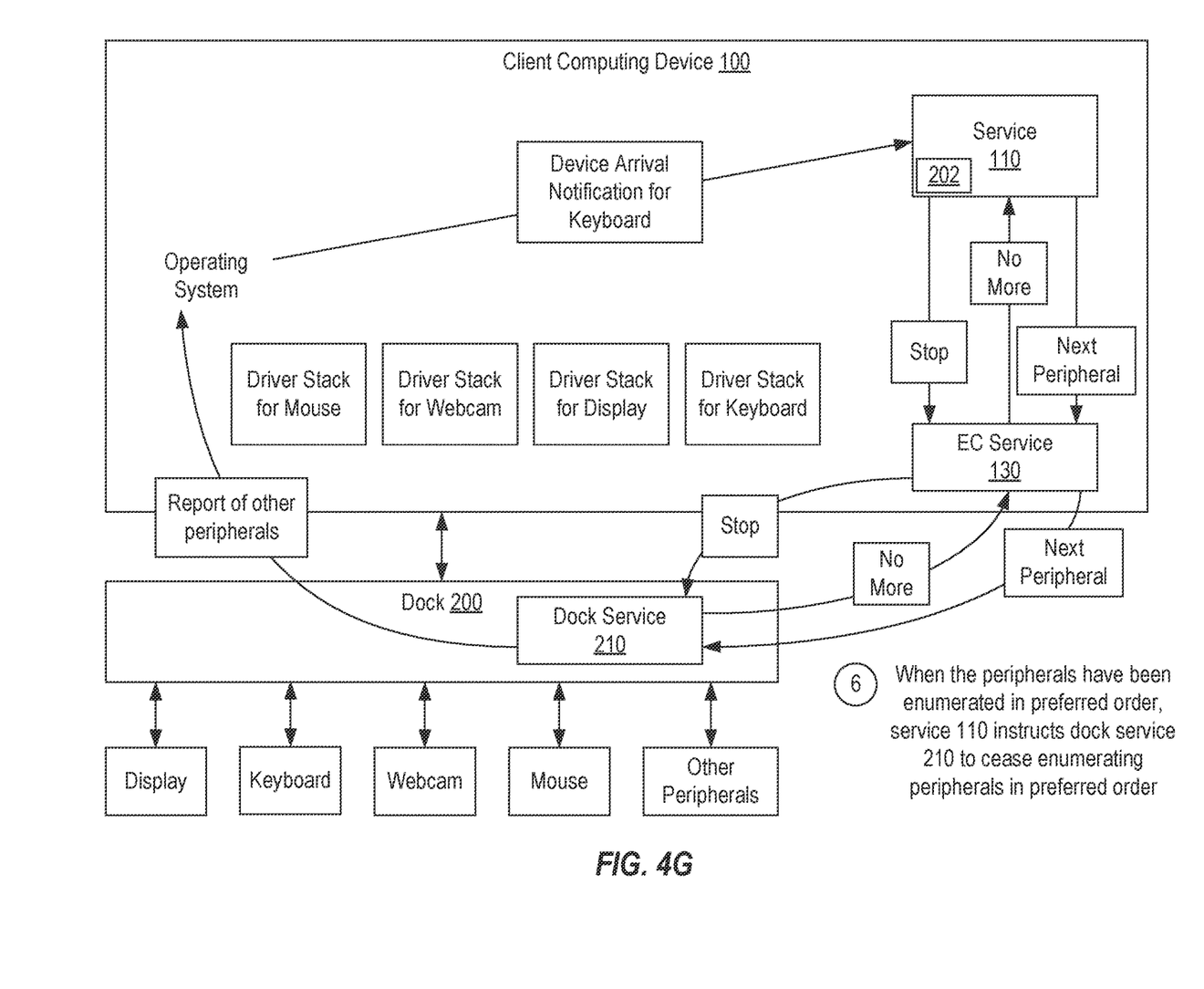

Turning to FIG. 4G, it is assumed that the process represented in FIG. 4F has been performed to enumerate the webcam, the display, and then the keyboard in the preferred order and that the operating system has notified service 110 of the enumeration of the keyboard. Service 110 then instructs dock service 210 via EC service 130 to report the next peripheral. However, dock service 210 reports back that all peripherals that should be reported in preferred order have been enumerated. In response, in step 6, service 110 instructs dock service 210 via EC service 130 to cease performing the one-by-one reporting of peripherals. Accordingly, dock service 210 can revert to reporting the remaining peripherals, including any subsequently connected peripherals, in a traditional/default manner such as by reporting all remaining peripherals at generally the same time without waiting for any further prompts from service 110/EC service 130 or immediately upon connection in the case of a newly connected device. Dock service 210 can remain in this state until client computing device 100 is disconnected from dock 200. When client computing device 100 is again connected to dock 200, the process can be repeated to enumerate peripherals in the preferred order.

Figure 5:
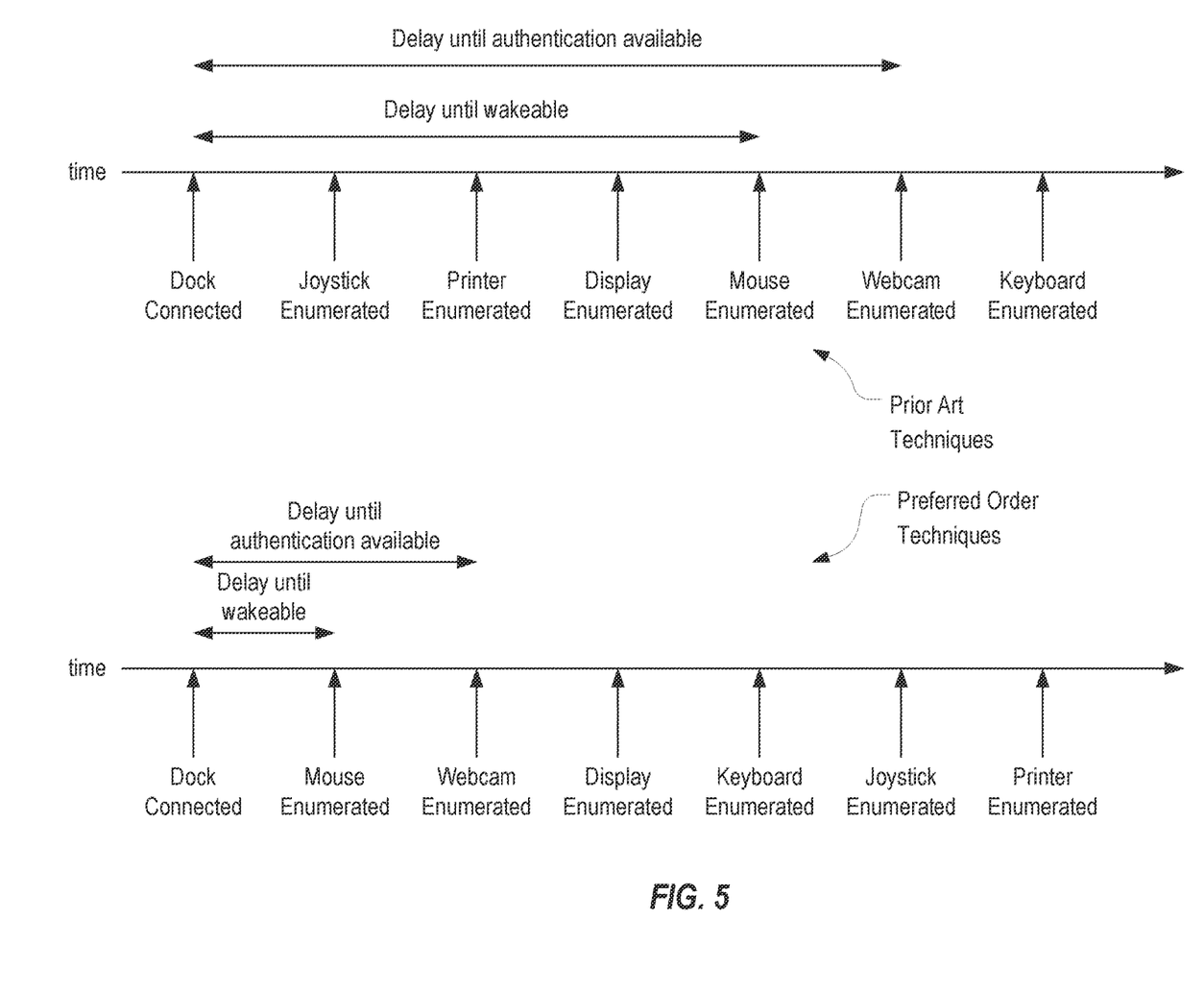
FIG. 5 provides an example of how the preferred order enumeration of peripherals can enhance a user's workspace experience.

FIG. 5 represents how the above-described process can provide an improved workspace experience for the user. The top timeline in FIG. 5 represents how dock-connected peripherals could be enumerated using prior art techniques. Because prior art techniques perform enumeration in a random manner (even if the peripherals may be reported in a specific order), the dock-connected peripherals may become accessible at random times. For example, when the dock-connected peripherals are reported to the operating system, the operating system could enumerate the joystick, the printer, the display, the mouse, the webcam, and then the keyboard. If the user uses the mouse to wake the system, there would be a noticeable delay before the user could do so. Likewise, if the user uses the webcam to authenticate, there would be a noticeable delay before the webcam became accessible for this purpose. In contrast, using the preferred order techniques of the present invention, the mouse could be enumerated first allowing the user to immediately wake the system. The webcam can be enumerated next again allowing the user to immediately authenticate.

In some embodiments, service 110 may also enable Bluetooth (or similar protocol) peripherals to be used to wake up the system or login. In such embodiments, service 110 could communicate directly with the Bluetooth peripherals to cause them to connect to client computing device 100 and wake up the system in conjunction with performing the preferred order enumeration as described above.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for enumerating peripherals that are connected to a dock in a preferred order, the method comprising:
   detecting that a client computing device has been connected to a dock to which peripherals are connected;

providing, to a dock service executing on the dock, a preferred order for enumerating the peripherals;

reporting, by the dock service, a first peripheral of the peripherals to an operating system of the client computing device; and waiting, by the dock service, to report a second peripheral of the peripherals to the operating system until being notified that the first peripheral has been enumerated on the client computing device.

2. The method of claim 1, further comprising:
selecting, by the dock service, the first peripheral based on the preferred order for enumerating the peripherals.

3. The method of claim 1, wherein an embedded controller service detects that the client computing device has been connected to the dock.

4. The method of claim 3, wherein the embedded controller service notifies a service executing on the client computing device that the client computing device has been detected to the dock, and wherein the service provides the preferred order for enumerating the peripherals to the dock service via the embedded controller service.

5. The method of claim 4, wherein the service notifies the dock service via the embedded controller service that the first peripheral has been enumerated on the client computing device.

6. The method of claim 5, wherein the service notifies the dock service via the embedded controller service that the first peripheral has been enumerated on the client computing device in response to receiving a device arrival notification pertaining to the first peripheral.

7. The method of claim 1, further comprising:
receiving, by the dock service, a notification that the first peripheral has been enumerated on the client computing device; and
reporting the second peripheral to the operating system.

8. The method of claim 7, further comprising:
selecting, by the dock service, the first peripheral and then the second peripheral based on the preferred order for enumerating the peripherals.

9. The method of claim 7, further comprising:
waiting, by the dock service, to report a third peripheral of the peripherals to the operating system until being notified that the second peripheral has been enumerated on the client computing device.

10. The method of claim 9, further comprising:
determining, by the dock service, that the preferred order for enumerating the peripherals does not define an order for the third peripheral; and
reporting, by the dock service, the third peripheral and one or more other peripherals of the peripherals without waiting for the third peripheral to be enumerated on the client computing device.

11. The method of claim 1, wherein the preferred order for enumerating the peripherals is based on how a user of the client computing device has used the peripherals when the client computing device was previously connected to the dock.

12. The method of claim 11, wherein the preferred order for enumerating the peripherals is based on one or both of a usage order or a usage frequency of the peripherals.

13. The method of claim 11, wherein the preferred order for enumerating the peripherals is based on a purpose of the peripherals.

14. The method of claim 1, wherein the first peripheral is used to wake up the client computing device.

15. The method of claim 1, wherein the first peripheral is used to authenticate.

16. One or more computer storage media storing computer executable instructions which when executed implement a method for enumerating peripherals that are connected to a dock in a preferred order, the method comprising:
detecting that a client computing device has been connected to a dock to which peripherals are connected;
providing, to a dock service executing on the dock, a preferred order for enumerating the peripherals;
for each of a first set of the peripherals, reporting, by the dock service, the peripheral to an operating system of the client computing device and then waiting until the peripheral is enumerated before reporting a next peripheral in the first set.

17. The computer storage media of claim 16, wherein the method further comprises:
for each of the first set of the peripherals, detecting, by a service executing on the client computing device, that the peripheral has been enumerated and, in response, notifying the dock service.

18. The computer storage media of claim 17, wherein the method further comprises:
for each of the first set of the peripherals, receiving, by the dock service, the notification that the peripheral has been enumerated; and
reporting the next peripheral in the first set.

19. The computer storage media of claim 18, wherein the first set includes less than all of the peripherals, and wherein, after reporting the first set of peripherals, the dock service reports remaining peripherals without waiting for enumeration of previously reported peripherals.

20. A system comprising:
a client computing device having an operating system, a service, and an embedded controller service; and
a dock having a dock service;
wherein the service, the embedded controller service, and the dock service are configured to enumerate peripherals connected to the dock in a preferred order by reporting a peripheral of the connected peripherals for enumeration and then waiting to report another peripheral of the connected peripherals until the enumeration is completed.

* * * * *